United States Patent
Muniyandi et al.

(10) Patent No.: US 9,154,722 B1
(45) Date of Patent: Oct. 6, 2015

(54) VIDEO PLAYBACK WITH SPLIT-SCREEN ACTION BAR FUNCTIONALITY

(71) Applicant: YuMe, Inc., Redwood City, CA (US)

(72) Inventors: Selvam Muniyandi, Chennai (IN); Thulasingam Punniyakotti, Chennai (IN)

(73) Assignee: YuMe, Inc., Redwood City, CA (US)

( * ) Notice: Subject to any disclaimer, the term of this patent is extended or adjusted under 35 U.S.C. 154(b) by 232 days.

(21) Appl. No.: 13/801,355

(22) Filed: Mar. 13, 2013

(51) Int. Cl.
*H04N 9/80* (2006.01)
*H04N 5/76* (2006.01)

(52) U.S. Cl.
CPC ...................................... *H04N 5/76* (2013.01)

(58) Field of Classification Search
CPC .......... G06Q 30/0241; H04N 21/4316; H04N 21/4725; H04N 21/812; H04N 21/8153
See application file for complete search history.

(56) References Cited

U.S. PATENT DOCUMENTS

| | | | |
|---|---|---|---|
| 2009/0235169 A1* | 9/2009 | Cheng | 715/719 |
| 2009/0276788 A1* | 11/2009 | Homma | 718/107 |
| 2010/0081116 A1* | 4/2010 | Barasch et al. | 434/252 |
| 2010/0141578 A1* | 6/2010 | Horiuchi et al. | 345/158 |
| 2010/0251158 A1* | 9/2010 | Geppert et al. | 715/771 |
| 2011/0004902 A1* | 1/2011 | Schultz et al. | 725/39 |
| 2012/0297400 A1* | 11/2012 | Hill et al. | 719/318 |

* cited by examiner

*Primary Examiner* — Huy T Nguyen
(74) *Attorney, Agent, or Firm* — TIPS Group (57) ABSTRACT

A method for video playback includes displaying a video on a screen, detecting a split-screen request, pausing the video and displaying a split-screen including a static upper section, a static lower section and a middle section including at least one active icon. In an example embodiment, the middle section includes an action bar including a number of active icons providing actions such as playing a new video in a new window, hyperlinking to a website, interacting with social media, etc. In a further example embodiment, the display of the split-screen involves capturing a static image of a screen of the video that was paused and animating a split of the static image to display the action bar in the middle section of the split-screen.

20 Claims, 6 Drawing Sheets

VIDEO PLAYBACK WITH SPLIT-SCREEN ACTION BAR FUNCTIONALITY

BACKGROUND

Electronic commerce, often known as "e-commerce", includes advertising as well as the buying and selling of products or services over electronic systems such as the Internet. The amount of trade conducted electronically has grown immensely with the widespread adoption of Internet technology. One particularly explosive area of growth in e-commerce is in the field of advertising and, in particular, video advertising on the Internet.

Video advertising over the Internet is supported by many hardware platforms, sometimes referred to herein as "client" or "user" devices. For example, video advertising can be displayed in web browsers of computers. Video advertising is also increasingly being implemented on mobile devices such as smartphones and tablet computers. With such advertising, the video advertisement is typically "streamed" from a server to the client device over a network such as the Internet, a wireless telephone network, a private network, etc.

A popular form of video advertisement is referred to as an "in-stream ad." With this technology, a short video advertisement (e.g. 15-30 seconds long) is play before ("pre-roll"), during ("mid-roll") or after ("post-roll") streaming video content that a client has requested. Since in-stream ads are frequently used to monetize the video content the publisher is delivering they usually must be played until completion. This is particularly true with pre-roll in-stream ads. As a result, they are not interactive media and the brand interaction of such ads is limited. Furthermore, the pre-roll advertisement can sometimes have the negative effect of brand degradation if users are forced to passively view an entire advertisement before being able to view their requested video content.

These and other limitations of the prior art will become apparent to those of skill in the art upon a reading of the following descriptions and a study of the several figures of the drawing.

SUMMARY

In an embodiment, set forth by way or example and not limitation, a method for video playback includes displaying a video on a screen, detecting a split-screen request, pausing the video and displaying a split-screen including a static upper section, a static lower section and a middle section including at least one active icon.

In an embodiment, set forth by way of example and not limitation, a non-transitory computer readable media containing program instructions executable on one or more computer processors includes code segments for displaying a video on a screen, code segments for detecting a split-screen request, code segments for pausing the video, and code segments for displaying a split-screen including a static upper section, a static lower section and a middle section including at least one active icon.

In an embodiment, set forth by way of example and not limitation, a video server includes a processor, a network connection coupled to the processor, and non-volatile memory coupled to the processor containing program instructions. In this example, the program instructions include code segments for streaming a video via the network connection, code segments for detecting a split-screen request via the network connection, code segments for pausing the streaming video, and code segments for displaying a split-screen including a static upper section, a static lower section and a middle section including at least one active icon via the network connection.

By pausing the video and providing an action bar, an engaging, online interactive user experience is created. Furthermore, there is the opportunity for additional, user initiated, brand interaction.

These and other embodiments, features and advantages will become apparent to those of skill in the art upon a reading of the following descriptions and a study of the several figures of the drawing.

BRIEF DESCRIPTION OF THE DRAWINGS

Several example embodiments will now be described with reference to the drawings, wherein like components are provided with like reference numerals. The example embodiments are intended to illustrate, but not to limit, the invention. The drawings include the following figures.

DETAILED DESCRIPTION OF EXAMPLE EMBODIMENTS

Figure 1:
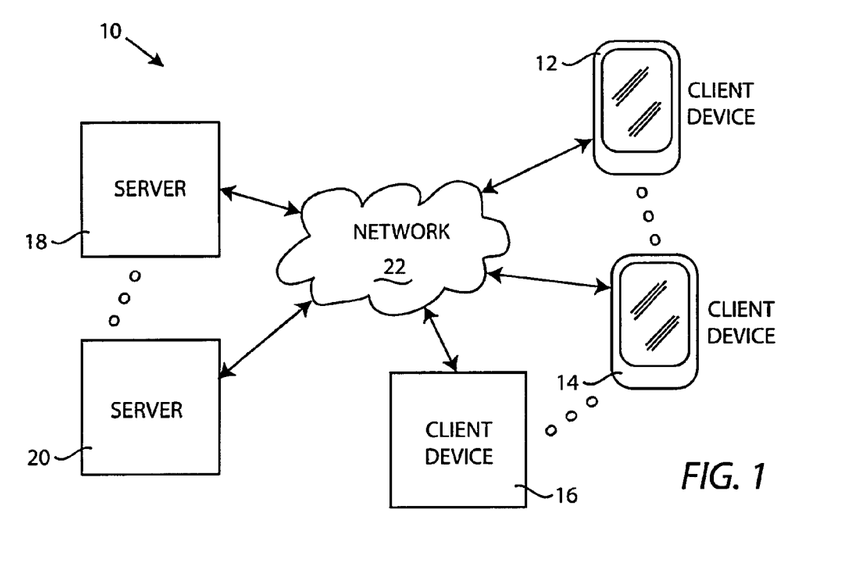
FIG. 1 is a block diagram of an example system which can be used in some implementations of one or more features described herein.

FIG. 1 is a block diagram of an example system 10 which can be used in some implementations of one or more features described herein. In this example, the system 10 includes one or more user client devices such as a smartphone 12, a tablet computer 14 and a computer 16, one or more video servers such as an ad server 18 and a video content server 20, and a network 22. As used herein, the words "client" and "user" may be used synonymously.

User client devices can be any devices that are operated by users and connected to network 22 by a communication link, such as a wireless or wired link. A client device can perform a variety of functions, including performing communications with other devices and running applications on the device that receive input from the user and provides output to the user. In some examples, the user input can be in various forms including contacting a touchscreen on the device, manipulating an input pointing device (e.g., mouse, trackball, touchpad, joystick, etc.), pressing physical keys or physical buttons (keyboard, buttons, etc.), providing voice or sound input to a microphone, causing motion of the device, etc. Any of a variety of devices can be used as user devices in addition to the non-limiting examples of smartphone 12, tablet computer 14 and computer 16 including, but not limited to, personal digital assistants (PDAs), game devices, televisions, telephones, media players, home appliances and devices, etc."

Video servers, such as ad server 18 and video content server 20, provide streaming video to client devices over network 22, in this non-limiting example. An ad server 18 can be provided by an advertiser or an ad network, and a video content server 20 can be provided by a number of sources including YouTube® of Mountain View, Calif. An ad server 18 can, for example, provide "pre-roll" in-stream ad which precedes video from video content server 20. Such pre-roll in-stream ad often takes the form of a 15-30 second video advertisement for a product or service. In other examples, more or fewer servers may be used to provide content and video advertising.

One or more networks 22 are used to provide communication channels for the various devices of system 10. Network 22 can be any type of communication network, such as the Internet, local area networks (LANs), cell phone networks, or other networks. Some implementations can provide features described herein on devices that are intermittently connected to network 22. A number of network communication protocols are suitable for the communication between the client devices and the servers of the system 10.

Figure 2:
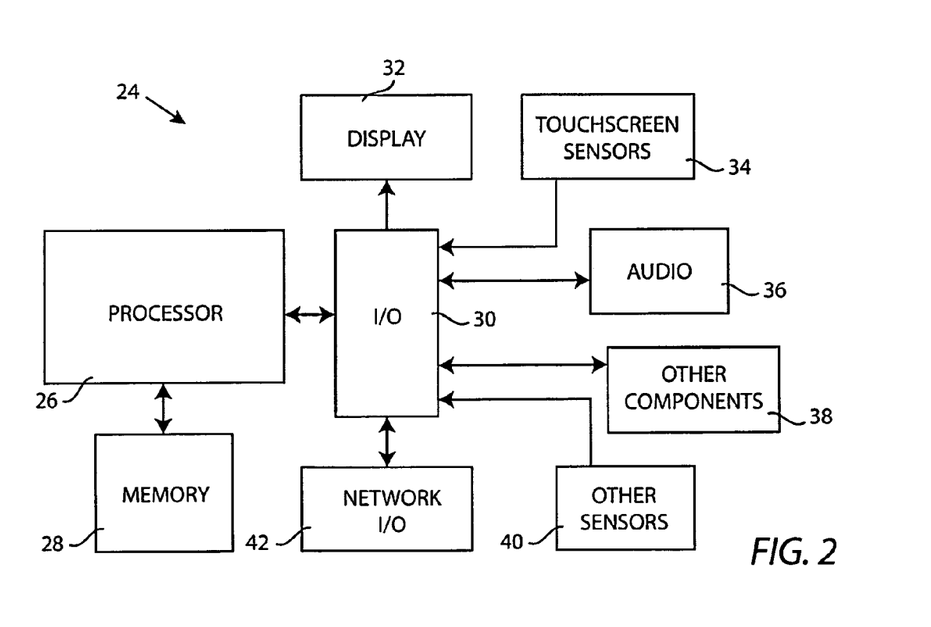
FIG. 2 is a block diagram illustrating an example mobile client device suitable for use with features described herein.

FIG. 2 is a block diagram illustrating an example client device 24 suitable for use with features described herein. For example, client device 24 can be used to illustrate mobile client devices such as smartphone 12 and tablet computer 14. In some implementations, a server system such as ad server 18 or advertiser server 20 can include some or all of the components shown for the example client device 24.

A processor 26 can be included in client device 24 to control operation of the device. The processor 26 can be one or more of any type of processors or processing circuitry, such as microprocessors, ASICs, FPGAs, logic gates, etc. The processor 26 can access memory 28 which can store a variety of program instructions and data for use and output by processor 26, including applications, operating system data, data received from other devices over a network, etc. In some implementations, memory 28 can be embedded in processor 26, and/or can be provided separately in the client device 24. Any of a variety of different types of memory can be used, such as RAM, ROM, Flash memory, EEPROM, etc. Some memory 28 can be "volatile" (e.g. its memory state is lost when power is removed) while other memory 28 can be "nonvolatile" (e.g. its memory state is retained when power is removed). All forms of memory 28 are considered to be "non-transitory", as set forth in a memorandum entitled, "Subject Matter Eligibility of Computer Readable Media" by David J. Kappos, Under Secretary of Commerce for Intellectual Property and Director of the United States Patent and Trademark Office dated Jan. 26, 2010, in that the memory 28 does not store data in a transitory propagating signal.

I/O circuitry 30 can be coupled to the processor 26 to interface the processor with a variety of different input components and output components for use with the client device 24. For example, a display 32 such as a display screen or other display device can output visual images, text, etc. produced by processor 26 and/or other components 38 of the client device 24. Touchscreen sensors 34 can be included on some types of device 24 to allow contact on or over the display screen 32 by a user or object to be sensed and the position of the contact relayed to processor 26. Audio devices 36 can be included, such as one or more speakers used to output sounds and music, and one or more microphones to receive voice input and other audio and relay the audio input to the processor 26.

Other various types of sensors 40 can be connected in device 24 and used to sense different characteristics, such as accelerometers and/or gyroscopes to sense motion of the client device 24 (e.g., tilting, rotation, or other movement in space), optical sensors to sense contact of the user on client device 24 or other objects in relation to the client device 24, magnetic sensors, or other types of sensors. Network I/O 42 can include one or more components for enabling communication of information between the client device 24 and other devices over a network. For example, wireless communication components can use radio frequency (RF), infrared (IR), or other wireless frequencies to communicate information in signals to and from wireless networks. Standard protocols such as cell phone protocols and/or WiFi can be used in some implementations. Other input and output components can also be included or connected to client device 24, such as components allowing various devices or networks to be connected via a wired connection to the client device 24, including Ethernet or other network components.

Figure 3:
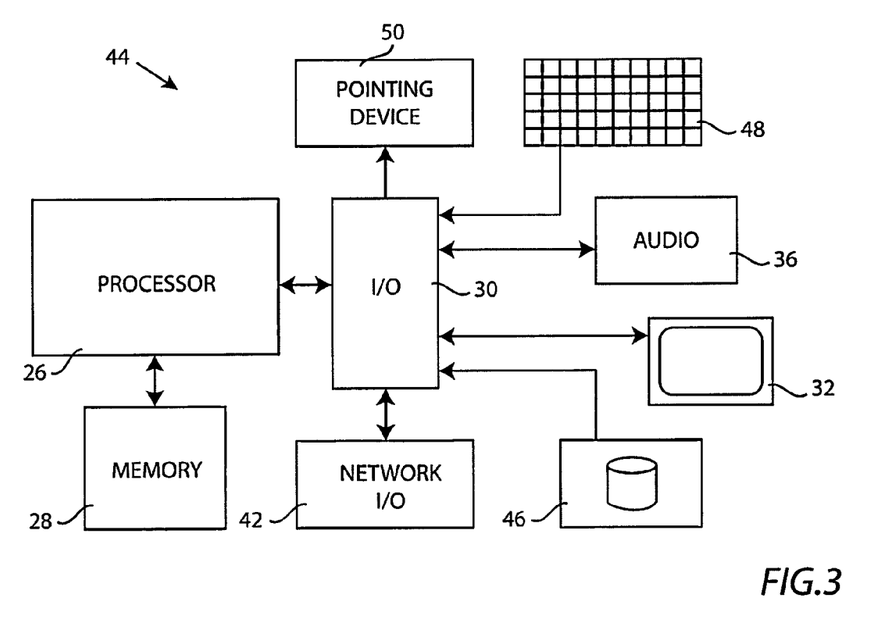
FIG. 3 is a block diagram illustrating an example client device, computer and/or server suitable for use with features described herein.

FIG. 3 is a block diagram illustrating an example computer system 44 suitable for use with features described herein. For example, some or all of the components of computer system 44 can be used as a server, such as ad server 18 and content server 20. Also, some or all of the components of computer system 44 can use used, for example, for client device 16. To the extent that components of client device 24 of FIG. 2 are analogous to components of computer system 44 of FIG. 3, like numerals will be used and the detailed descriptions of the components will not be repeated for the sake of brevity.

When used as a computer, such as client device 16, computer system 44 includes a processor 26, memory 28, I/O 30, display 32, audio 36 and network I/O 42 as described previously with respect to FIG. 2. In addition, certain embodiments include mass storage 46, a keyboard 48 and a pointing device 50. Mass storage 46 is often in the form of non-volatile read/write memory, such as a hard disk drive or flash memory, but also includes read-only memory, such as certain optical disc memories. The pointing device 50 can include a number of device types including a mouse, a trackball, a touch screen, a touch pad, etc. When used as a server, such as ad server 18 or content server 20, fewer of the components of example computer system 44 may be required.

Figure 4:
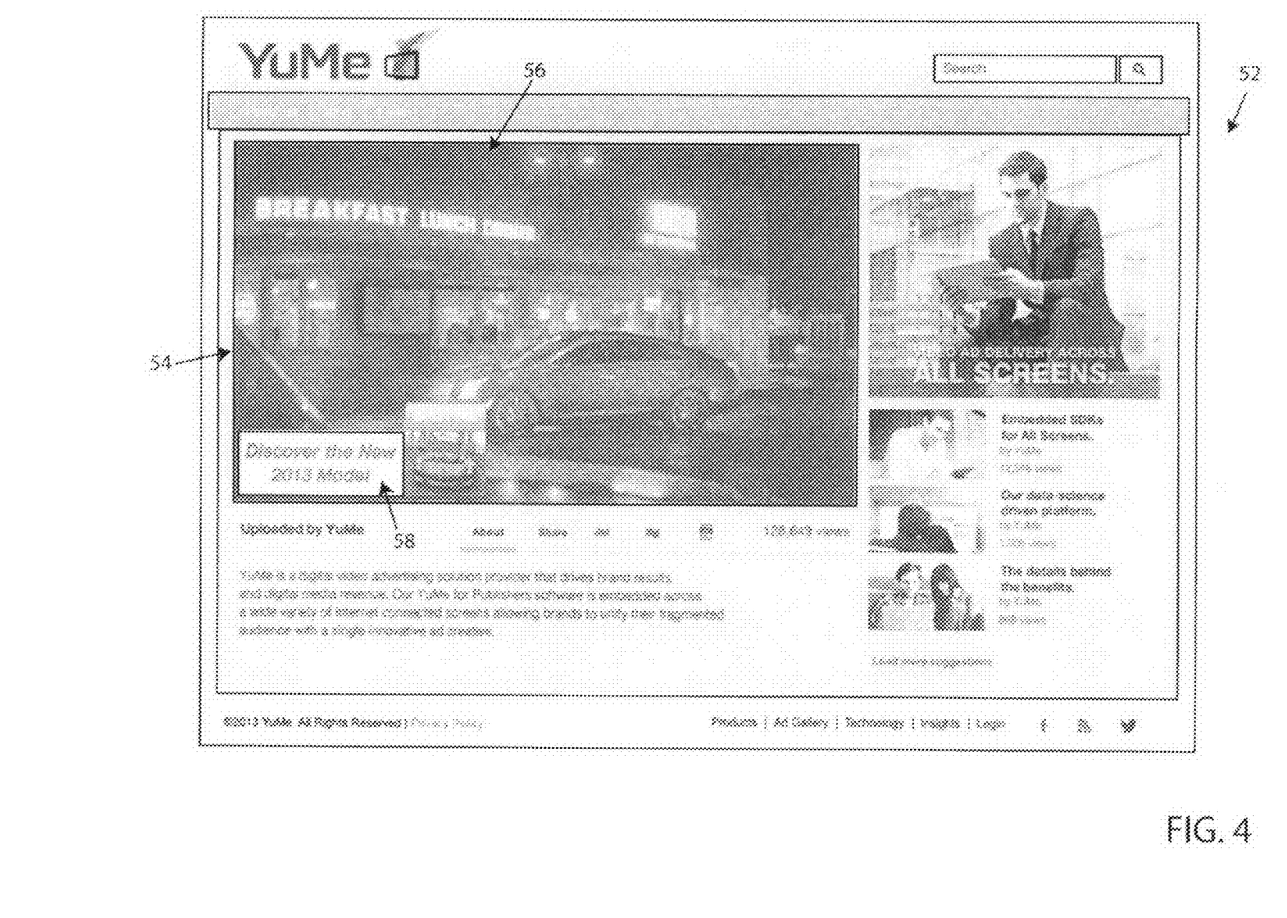
FIG. 4 is an illustration of a web page having a window displaying an example video.

FIG. 4 is an illustration of a web page 52 having a window 54 for displaying video. The web page 52 may be displayed, for example, on a display of a client device. In this non-limiting example, the video being displayed is an in-stream ad 56 (e.g. a pre-roll video) for a "New 2013 Model" car. In other examples, the video need not be streamed and can be stored in any convenient non-transitory computer readable media.

In this non-limiting example, an icon 58 including the words "SPLIT ME" is provided and overlays the in-stream ad 56. A user can select (or "click on") the icon 58 to "split" the in-stream ad 56 by using a pointing device, such as a mouse. The user selection of the icon 58 causes the in-stream ad 56 to pause and "splits" the screen (e.g. the area within window 54 in this example) for the introduction of an action bar, as will be discussed in greater detail subsequently. As used herein, the term "screen" can refer generally to the area in which the streaming or other video is displayed. For example, a "screen" on a smartphone comprises that portion of the smartphone display in which video is visibly played.

Figure 5:
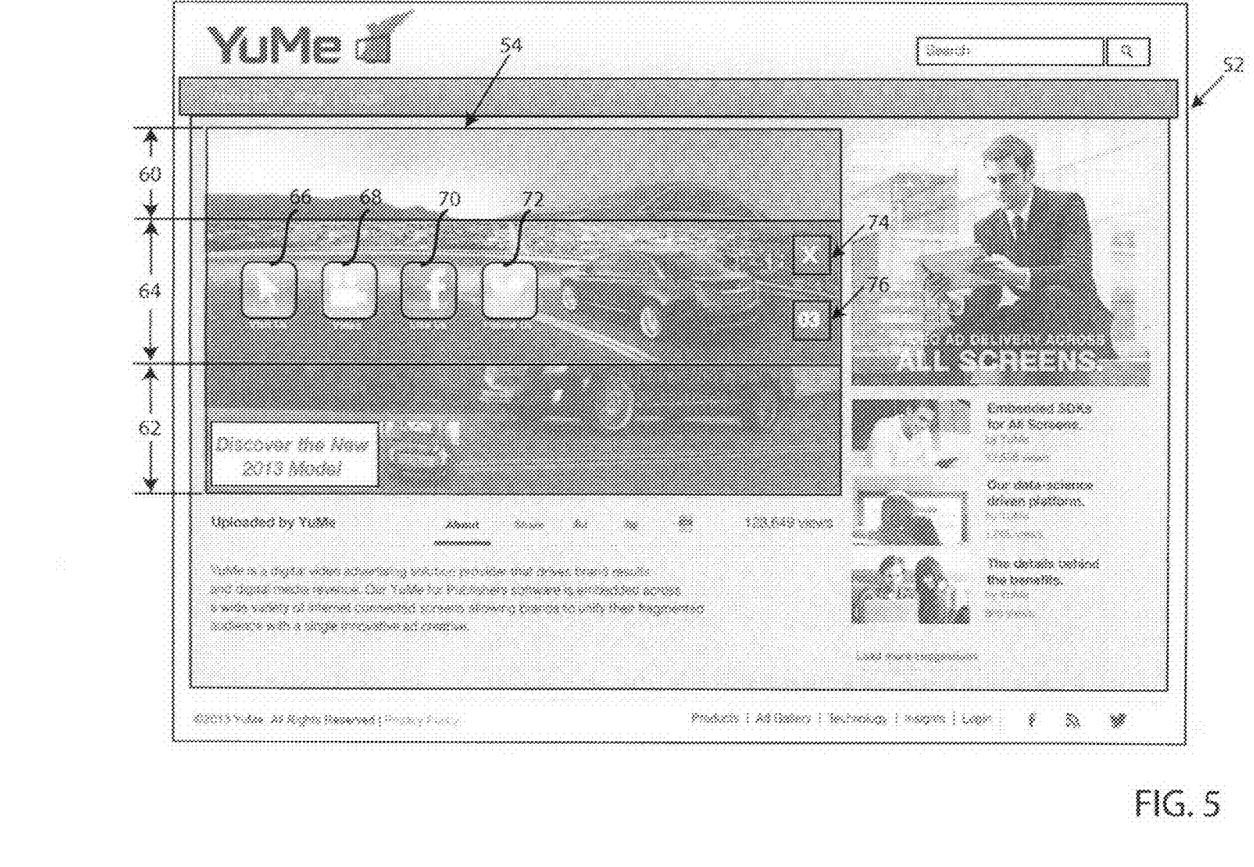
FIG. 5 is an illustration of a web page having a window displaying an example split-screen with action bar functionality.

In FIG. 5, the window 54 of web page 52 has been "split" into three sections including an upper section 60, lower section 62, and a middle section 64. By "static" it is meant that the upper section 60 and lower section 62 are not moving when in their final position, e.g. they are not video displays, animations, etc. but, rather, static displays such as bitmaps, etc. In a non-limiting embodiment, upper section 60 and lower section 62 are derived from portions of a single video frame of a pre-roll, in-line ad.

The middle section 64 is alternatively referred to herein as an "action bar" after the screen achieves its final, split configuration because it includes one or more active icons, such as icons 66-72. In this non-limiting example, icon 66 is a hyperlink to a website, icon 68 facilitates the display of a new video in a new window, icon 70 will allow a user to "Like" the advertised product with Facebook®, and icon 72 will allow a user to follow the advertiser on Twitter®. It will be appreciated that other active icons are also available, such as icons or "buttons" allowing users to vote on a particular issue, display new videos, purchase an item, etc. Pausing the video and providing an action bar creates an engaging, online interactive user experience with the opportunity for additional, user initiated, brand interaction.

Action bar 73, in this non-limiting example, includes a "close" button 74 and a countdown display 76 which displays the number of seconds until the end of a timeout period. The close button 74 allows users to quickly return to the in-stream ad 56 (see FIG. 4) if they are not interested in any of the available actions presented by action bar 73. In this non-limiting example, a timeout period automatically returns users to the in-stream ad after a certain number of seconds (e.g. 10 seconds). This is considered desirable by advertisers in that it requires that users complete the viewing of the in-stream ad.

Figure 6A:
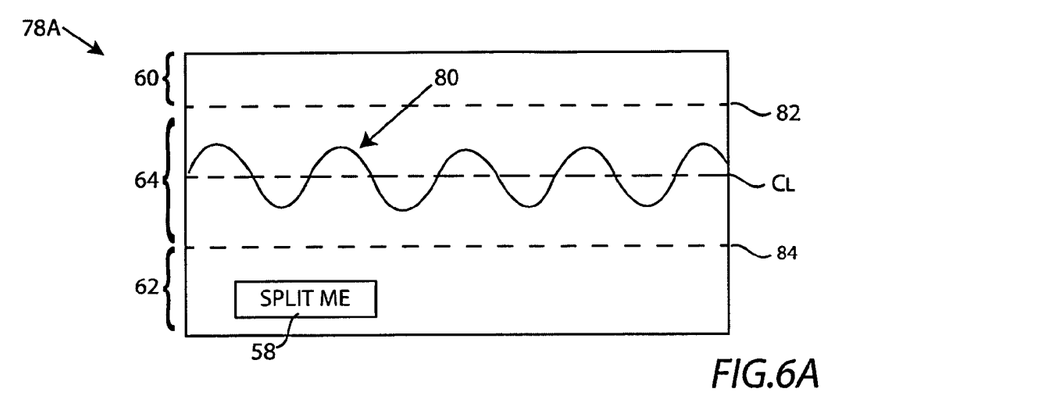
FIGS. 6A, 6B and 6C illustrate an example split animation process.
Figure 6B:
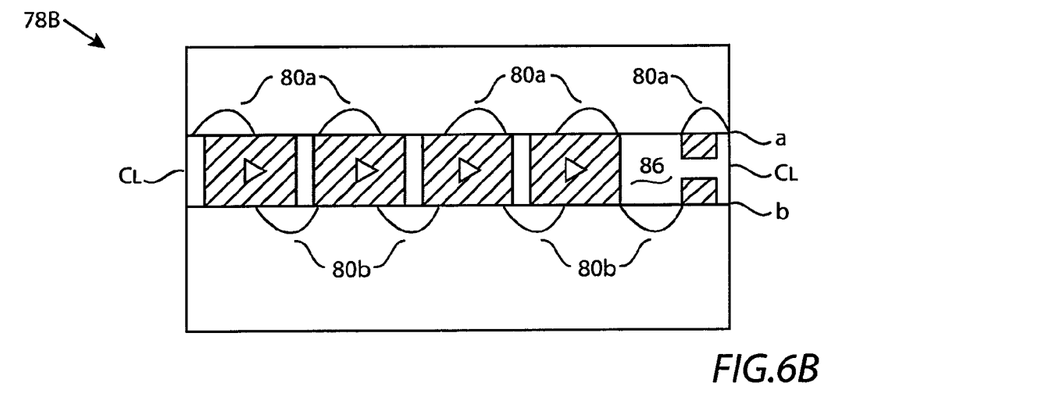
Figure 6C:
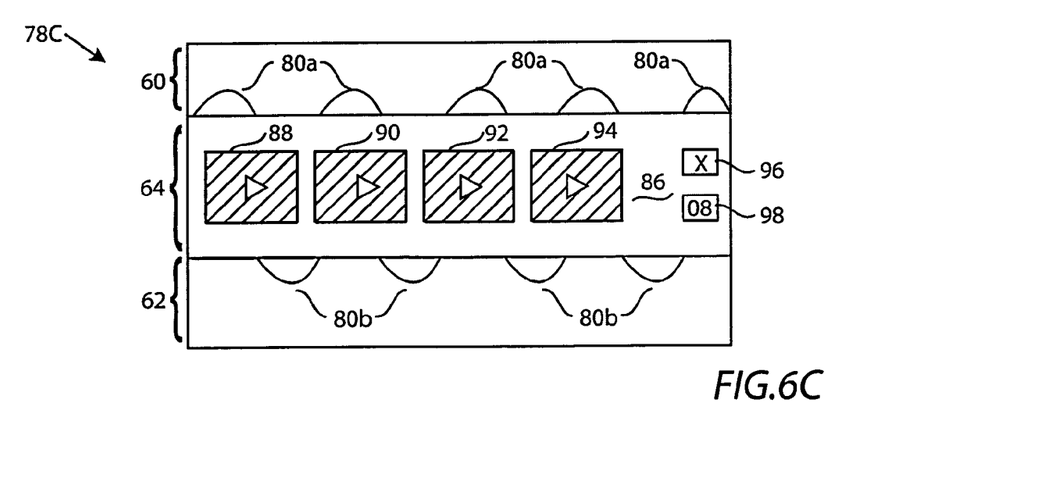

FIGS. 6A-6C illustrate, by way of example and not limitation, how a screen can be "split" for the provision or an action bar. In FIG. 6A, a screen 78A is shown playing a video, which for the purpose of this example is a sine wave 80. A "SPLIT ME" icon 58 is provided, in this example, in the lower left hand corner of screen 78A as an overlay to the video. In this example, until a user requests that the screen be split by selecting icon 58, the video continues to play until completion.

When a user selects or "clicks" the SPLIT ME icon 58, the video playback is paused using streaming video playback tools well known to those of skill in the art. In this non-limiting example, the last frame, or screen image, of the video is captured as a static image and is converted into bitmap data. Then, also in this example, a mask is applied to the bitmap and the visible screen height and width are measured. Based upon the width and height of the visible screen, it is "split" into three parts as indicated by an upper broken line 82 and a lower broken line 84 to define the upper section 60, lower section 62 and middle section 64.

In this example, the screen 78A will be "split" along the broken line $C_L$. In certain embodiments the three sections are all equal, while in other embodiments the three sections are not all equal. Also, in some embodiments the center line $C_L$ is at the center of screen 78A, and in other embodiment is above or below the center of screen 78A. The selection of the SPLIT ME icon 58 also starts a countdown timer which determines the number of seconds left in a timeout period, and initiates the introduction of an action bar, as will be discussed subsequently.

In FIG. 6B, the screen 78B is illustrated to be partially "split" with respect to the centerline $C_L$. As can be seen, the portions 80a of the sine wave 80 that were above the centerline $C_L$ in FIG. 6A are moved up to a position "a", while the portions 80b of the sine wave 80 that were below the centerline $C_L$ in FIG. 6A are moved down to a position "b". That is, the sine wave 80 has been split down the middle such that the top half is separated from the bottom half by the distance a-b, which defines a space in which an action bar 86 can be partially seen.

In FIG. 6C, a split-screen 78C is illustrated including a static upper section 60, a static lower section 62, and a middle section 64 defining an action bar 86. In this non-limiting example, four active icons are provided by the action bar 86, namely video icons 88, 90, 92 and 94. By selecting any one of these icons, a new video is caused to be played in a new window. The action bar 86 also includes a close button 96 and a countdown display 98, which in this example indicates that eight seconds remain before the screen is "un-split" and the pre-roll, in-line ad again begins to play.

It should be noted that, after splitting, the upper section 60 and the lower section 62 are static and unmoving, as they are portions of a bitmapped frame or "screen" of the pre-roll in-stream ad, in this non-limiting example. These sections are not "static" during the split animation process or the reverse split animation process to be discussed subsequently as they are animated to make them appear that they are moving apart from the centerline $C_L$.

There are a number of ways to create the animations referred to above. For example, Adobe Systems, Incorporated. of San Jose, Calif. produces a development tool known as Adobe Flash® which allows animation to be programmed using an object-oriented language called ActionScript®. ActionScript allows for the separate animation of the sections 60, 62 and 64 or the screen using scripts, greatly facilitating the animation process, as will be appreciated by those of skill in the art.

With reference again to FIG. 6C, a user is "called to action" by the active icons 88-94. If one of those icons is selected, a new video will be opened in a new window for the user. However, if the user selects the close button 96, or if the action bar 86 "times out" as indicated by the countdown display 98 a "reverse split" animation is initiated, in certain non-limiting examples. For example, after a timeout, the screen 78C of FIG. 6C begins to "un-split" as illustrated by FIG. 6B and then returns to its original configuration as illustrated by FIG. 6A. This reverse split animation can, again, be conveniently implemented in a scripted animation language such as ActionScript. Once the screen has been un-split as illustrated in Fig. 6A, the video is "un-paused" and allowed to continue playing.

Figure 7:
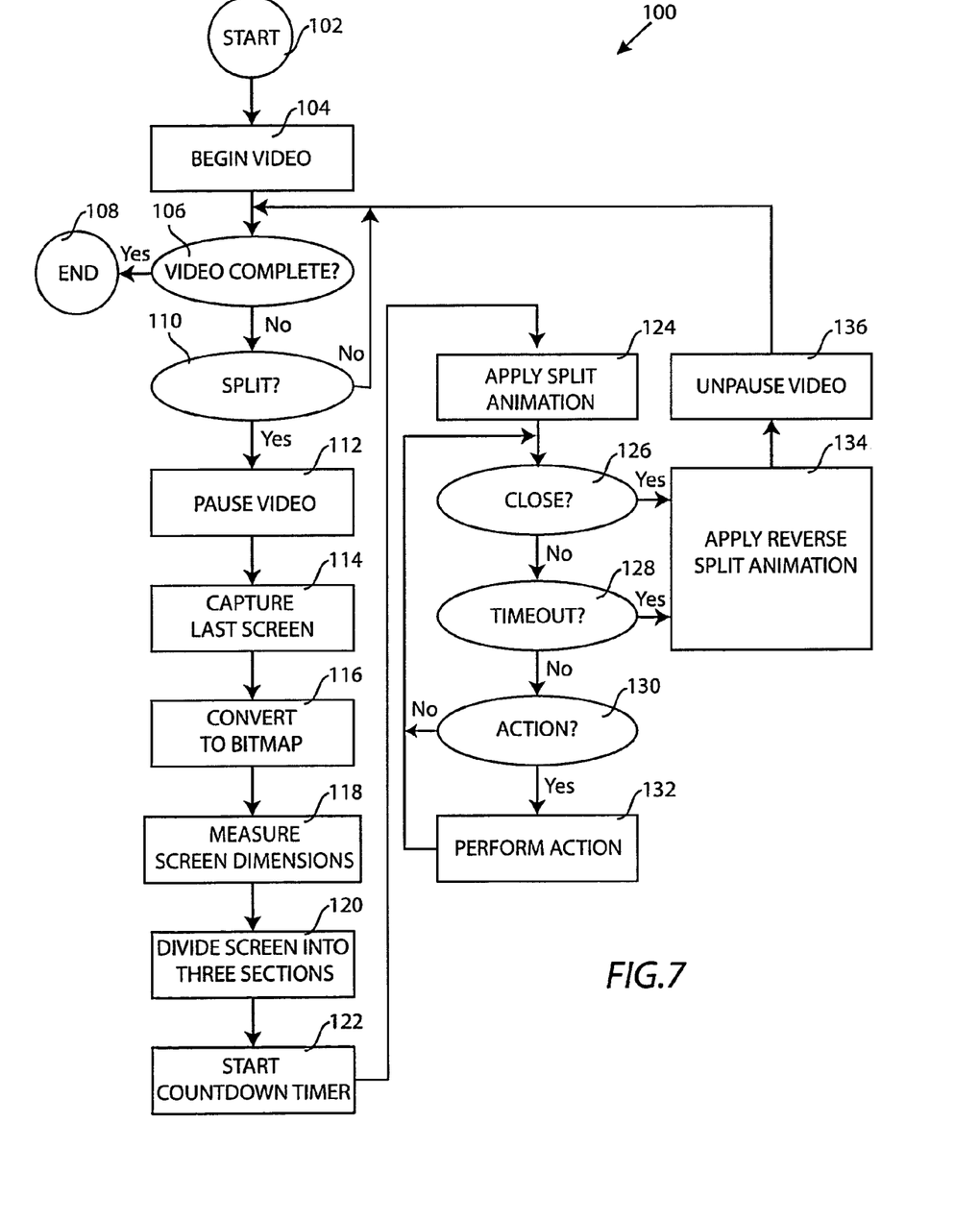
FIG. 7 is a flow diagram illustrating an example process for providing video playback with split-screen action bar functionality.

FIG. 7 is a flow diagram illustrating a process 100, set forth by way of example and not limitation, of video playback with split-screen action bar functionality. Process 100 begins at 102 and, in an operation 104, video begins to play on a screen of a client device. Next, in an operation 106, it is determined if the video has been entirely played and, if so, the process end at 108. If the video is not complete, an operation 110 determines if there has been a split-screen request from a user, e.g. by clicking on a SPLIT ME icon. If not, control returns to operation 106.

If there has been a split-screen request from a user, an operation 112 causes the video to pause. This can be accomplished, for example, by making a pause request to the server providing the streaming video. Next, in this non-limiting example, the last screen of the video is captured. For example, the last 1-frame of an MPEG video stream can be captured. Next, in an operation 116, the last screen is converted into bitmap form and the visible screen dimensions (length and height) are measured. Operation 120 uses the screen dimension information to divide the screen into three sections, which may or may not be equal. An operation 122 starts a countdown timer to count the timeout period for the action bar.

The split animation, as described above, is then applied in an operation 124. In operations 126 and 128 it is determined if there has been a close command or a timeout, respectively, with respect to the action bar. If not, an operation 130 determines if one of the action icons has been selected. If so, the action is performed in operation 132 and process control is returned to operation 126 and, if not, process control is returned directly to operation 126. If either operation 126 or 128 detects a "close" command or a timeout, respectively, an operation 134 applies the reverse-split animation described above. Operation 136 then "un-pauses" the video, e.g. starts the video from the place where it was paused, and process control returns to operation 106.

Although various embodiments have been described using specific terms and devices, such description is for illustrative purposes only. The words used are words of description rather than of limitation. It is to be understood that changes and variations may be made by those of ordinary skill in the art without departing from the spirit or the scope of various inventions supported by the written disclosure and the drawings. In addition, it should be understood that aspects of various other embodiments may be interchanged either in whole or in part. It is therefore intended that the claims be interpreted in accordance with the true spirit and scope of the invention without limitation or estoppel.

What is claimed is:

1. A method for video playback comprising:
    displaying a streaming video on a screen of a user device, wherein the streaming video is supplied by a remote server;
    detecting a split-screen request;
    pausing the video on a frame of the video; and
    performing a split animation of the frame of video to display a split-screen including a static upper section, a static lower section and a middle section, wherein the static upper section and the static lower section comprise at least a portion of the frame of the video, and the middle section comprises an action bar having a plurality of active icons.

2. A method for video playback as recited in claim 1 wherein the user device is a mobile device capable of communicating over at least one network.

3. A method for video playback as recited in claim 2 wherein the mobile device is either a smartphone or a tablet computer.

4. A method for video playback as recited in claim 1 wherein the user device is a computer having the screen, and wherein the streaming video is displayed on the screen in a window of a web browser.

5. A method for video playback as recited in claim 4 wherein detecting a split-screen request includes selecting an icon displayed in the window of the web browser.

6. A method for video playback as recited in claim 1 further comprising detecting a selection of at least one active icon of the action bar.

7. A method for video playback as recited in claim 6 further comprising performing an action related to the selection of the at least one active icon.

8. A method for video playback as recited in claim 1 wherein the action bar includes a close button and further comprising displaying and un-pausing the video upon a detection of a selection of the close button by a user.

9. A method for video playback as recited in claim 1 further wherein the action bar includes a countdown timer for a timeout period and further comprising displaying and un-pausing the video upon a detection of the expiration of the timeout period.

10. A method for video playback as recited in claim 1 wherein the frame of the video is displayed prior to a resumption of the play of the video.

11. A method for video playback as recited in claim 1 wherein a reverse split animation is performed prior to a resumption of play of the video.

12. A method for video playback as recited in claim 1 wherein a selection of the at least one active icon causes a new video to be displayed in a new window.

13. A method for video playback as recited in claim 1 wherein a selection of the at least one active icon causes a new web page to be displayed in a new window.

14. A method for video playback as recited in claim 1 wherein a selection of the at least one active icon causes a social media interaction.

15. Non-transitory computer readable media containing program instructions executable on one or more computer processors comprising:
    code segments for displaying a streaming video on a screen;
    code segments for detecting a split-screen request;
    code segments for pausing the video on a frame of the video; and
    code segments for performing a split animation of the frame of video to display a split-screen including a static upper section, a static lower section and a middle section including at least one active icon, wherein the static upper section and the static lower section comprise at least a portion of the frame of the video; and
    code segments for a reverse split animation performed prior to un-pausing the video.

16. Non-transitory computer readable media containing program instructions executable on one or more computer processors as recited in claim 15 further comprising code segments for detecting a selection of the at least one active icon.

17. Non-transitory computer readable media containing program instructions executable on one or more computer processors as recited in claim 15 further comprising code segments for performing an action related to the selection of the at least one active icon.

18. A video server comprising:
    a processor;
    a network connection coupled to the processor; and
    non-volatile memory coupled to the processor containing program instructions including:
        code segments for streaming a video via the network connection;
        code segments for detecting a split-screen request via the network connection;
        code segments for pausing the streaming video on a frame of the video; and
        code segments for performing a split animation of the frame of video to display a split-screen including a static upper section, a static lower section and a middle section including at least one active icon via the network connection, wherein the static upper section and the static lower section comprise at least a portion of the frame of the video which has been split apart to display the middle section.

19. A video server as recited in claim 18 further comprising code segments for detecting a selection of the at least one active icon.

20. A video server as recited in claim 19 further comprising code segments for performing an action related to the selection of the at least one active icon.

* * * * *